(12) United States Patent
Hengl et al.

(10) Patent No.: US 12,403,644 B2
(45) Date of Patent: Sep. 2, 2025

(54) APPARATUS AND METHOD FOR FORMING PLASTIC PREFORMS INTO PLASTIC CONTAINERS WITH ADJUSTABLE THROTTLE

(71) Applicant: KRONES AG, Neutraubling (DE)

(72) Inventors: Benedikt Hengl, Essing (DE); Andreas Brunner, Aufhausen (DE); Dieter Finger, Neutraubling (DE); Markus Kulzer, Zell (DE); Dominik Meier, Parsberg (DE); Thomas Gerstenberg, Regensburg (DE); Konrad Senn, Alteglofsheim (DE); Daniel Vogler, Neutraubling (DE); Thomas Hoellriegl, Teublitz (DE); Klaus Voth, Obertraubling (DE); Christian Betz, Geigant (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/942,999

(22) Filed: Sep. 12, 2022

(65) Prior Publication Data

US 2023/0134386 A1 May 4, 2023

(30) Foreign Application Priority Data

Oct. 28, 2021 (DE) ..................... 10 2021 128 205.5

(51) Int. Cl.
*B29C 49/78* (2006.01)
*B29C 49/42* (2006.01)

(52) U.S. Cl.
CPC ........ *B29C 49/783* (2013.01); *B29C 49/4289* (2013.01); *B29C 2049/7831* (2022.05); *B29C 2049/7833* (2022.05)

(58) Field of Classification Search
CPC ....... B29C 49/78; B29C 49/42; B29C 49/783; B29C 49/4289; B29C 2049/7831; B29C 2049/7833; B29C 49/16; B29C 47/10
See application file for complete search history.

(56) References Cited

U.S. PATENT DOCUMENTS

| 1,087,717 A | 2/1914 | Brewster ................. B29C 49/18 |
| 4,984,977 A * | 1/1991 | Grimminger ........... B29C 48/06 |
| | | 425/185 |

(Continued)

FOREIGN PATENT DOCUMENTS

| DE | 202004021477 | 5/2008 | ............ B29C 49/16 |
| DE | 102009041013 | 9/2009 | ............ B29C 49/18 |

(Continued)

OTHER PUBLICATIONS

German Search Report issued in German Patent Appln. Serial No. 10 2021 128 205.5, dated May 11, 2022, with machine English translation, 16 pages.

(Continued)

*Primary Examiner* — Alison L Hindenlang
*Assistant Examiner* — Shibin Liang
(74) *Attorney, Agent, or Firm* — HAYES SOLOWAY P.C.

(57) ABSTRACT

Apparatus for forming plastic preforms into plastic containers, having a forming device which has a plurality of forming stations each having a stretching bar for stretching the plastic preform and an application device act upon the plastic container with a flowable medium. The forming device has at least four pressure reservoirs for the flowable medium, which each have predetermined pressures, and a valve block with at least five process valves. The application device is configured for producing a fluid connection between the valve block and a mouth region of the plastic preform in order to act upon the plastic preforms with the pressurised flowable medium, and the process valves are (Continued)

configured to act upon the plastic preforms with different pressures, wherein at least one process valve is configured for producing a connection between the plastic preform and an environment.

13 Claims, 6 Drawing Sheets

(56) References Cited

U.S. PATENT DOCUMENTS

| | | | |
|---|---|---|---|
| 8,262,384 B2 | 9/2012 | Blochmann | |
| 8,658,080 B2 | 2/2014 | Brunner et al. | B29C 49/18 |
| 9,044,892 B2 | 6/2015 | Hirdina | B29C 39/02 |
| 9,339,969 B2 | 5/2016 | Asbrand et al. | B26C 49/78 |
| 10,046,504 B2 | 8/2018 | Rymann | |
| 10,112,337 B2 | 10/2018 | Litzenberg et al. | B29C 49/18 |
| 10,857,717 B2 | 12/2020 | Litzenberg et al. | B29C 49/18 |
| 11,453,155 B2 | 9/2022 | Derrien et al. | |
| 2008/0191394 A1 | 8/2008 | Elliott | B29C 49/18 |
| 2011/0057343 A1* | 3/2011 | Brunner | B29C 49/783 |
| | | | 425/522 |
| 2015/0076747 A1 | 3/2015 | Winzinger et al. | |
| 2015/0209997 A1 | 7/2015 | Lemble | |
| 2016/0325484 A1* | 11/2016 | Rymann | B29C 49/78 |
| 2016/0332355 A1* | 11/2016 | Rymann | B29C 49/783 |
| 2021/0146595 A1 | 5/2021 | Handschuh et al. | B29C 49/42 |
| 2021/0394424 A1 | 12/2021 | Derrien et al. | |
| 2023/0134386 A1 | 5/2023 | Hengl et al. | |

FOREIGN PATENT DOCUMENTS

| | | | |
|---|---|---|---|
| DE | 102012010985 | 12/2013 | |
| DE | 102014010861 | 7/2014 | B29C 49/78 |
| DE | 202004018237 | 3/2025 | |
| EP | 1974892 | 10/2008 | B29C 49/78 |
| EP | 1727661 | 9/2009 | B29C 49/78 |
| EP | 2298534 | 3/2011 | B29C 49/78 |
| EP | 2722153 | 4/2014 | B29C 49/78 |
| EP | 3825097 | 5/2021 | B29C 49/42 |
| WO | WO2014068080 | 5/2014 | B29C 49/12 |

OTHER PUBLICATIONS

European Search Report issued in European Patent Appln. Serial No. 22204151.9, dated Feb. 23, 2023, with machine English translation, 15 pages.

Notification of Objection filed in counterpart EP Application Serial No. 22204151.9, dated May 19, 2025, with macine translation, 47 pages.

* cited by examiner

APPARATUS AND METHOD FOR FORMING PLASTIC PREFORMS INTO PLASTIC CONTAINERS WITH ADJUSTABLE THROTTLE

BACKGROUND OF THE INVENTION

The present invention relates to an apparatus and a method for forming plastic preforms into plastic containers. The forming device, and in particular the blow-moulding machine or stretch-blow-moulding machine, has several blowing stations with blow moulds which form a cavity which corresponds to the negative shape of the plastic container to be produced. The plastic preforms are usually stretched longitudinally inside the blow moulds with a stretching bar and then formed into the plastic containers by applying a flowable medium. The flowable medium is applied in several different pressure stages with different pressure levels.

It is known from the applicant's internal prior art to recycle compressed air during stretch blow moulding. If the recycling is ideally set, the recycling of a previous plastic container of a higher pressure level feeds the blowing air consumption of the current plastic container in the next lower pressure level. Fresh air, i.e. new compressed air, is only supplied at the highest pressure level in such an ideal process, then passes through the pressure levels in stages, in different containers and is then vented at the last container.

The high-pressure air requirement per container is therefore determined by the relief quantity in a well-set recycling system. This in turn results from the container volume, the dead space volume of the valve block and the relief pressure. The container volume is given and cannot be changed, so that the dead space volume and the relief pressure must be reduced. The dead space volume can be reduced, for example, by suitable arrangement of the valves and small flow channels, and the relief pressure can be reduced by suitable process settings.

However, reducing the relief pressure is not possible in any arbitrary way. Firstly, the relief pressure must be higher than the first pressure P1, otherwise the air cannot be recycled without an additional compression unit. The required pressure P1 depends not only on the container and its desired material distribution but also on the geometries and flow values of the valve block and cannot be lowered easily. Typical known pressures P1 are between 6.5 and 11.5 bar, so the relief pressures are between 7 and 12 bar. On the other hand, if the pre-blowing pressure P1 is too low, the air volume cannot be cleanly utilised from the preceding recycling stages, so that if the difference between the pressure P1 and the pressure P2 is too great, recycling cannot be ideal with only one intermediate stage and air must be discharged from the intermediate circuit, or the relief pressure is significantly higher than the pressure P1.

To address the problem of a too large difference between P1 and P2 for an intermediate stage, a further intermediate or recycling stage can be introduced. Adding another pressure stage is advantageous for consumption in terms of the possibility of better recycling, but it also has disadvantages.

Adding another intermediate stage requires a larger installation space, which results in a larger dead space as a further valve has to be connected to the container. In addition, the control air consumption increases as a further pneumatically pilot-operated valve has to be opened and closed twice (when blowing and when recycling), as well as the pressure rise time, as several stages have to switch in succession and each switching operation costs time, and the pressure difference upstream and downstream of the valve is smaller with several smaller stages than with a few large ones. This can lead to poor embossing quality or high finished blowing air pressure requirements.

The forming device or the valve block also comprises an adjustable pre-blowing (throttle), wherein the volume flow is adjusted by varying the pre-blowing pressure. As is known from the internal prior art of the applicant, the throttle is currently a 4-stage, adjustable pre-blowing throttle, which is adjusted manually. Between the throttle and the valve there is an unthrottled air volume which pre-fills the dead space.

It is therefore currently necessary to manually adjust each blowing station on the machine, which is a source of error. In addition, the machine must be stopped. Furthermore, in the known arrangements, the volume between the throttle and the valve is predefined, so that if the volume flow is increased, the pressure level must also be raised, which leads to increased energy consumption.

SUMMARY OF THE INVENTION

The present invention is therefore based on the object of providing an apparatus and a method which enables faster blow moulding with lower energy and, in particular, air consumption. In particular, a minimum compressed air requirement is to be achieved over various container sizes without compromising bottle quality or embossing quality. According to the invention, this object is achieved by the subject matters of the independent claims. Advantageous embodiments and further developments are the subject of the sub-claims.

The invention is therefore directed to an apparatus for forming plastic preforms into plastic containers, with a forming device which has a plurality of forming stations which each have a blow mould within which the plastic preforms can be formed into the plastic containers, wherein the forming stations each having a stretching bar for stretching the plastic preform in its longitudinal direction and an application device for applying the plastic container with a flowable medium and in particular compressed air. Preferably, the application device comprises a blowing piston and a blowing nozzle.

Furthermore, the forming device comprises at least four pressure reservoirs for the flowable medium, each having predetermined pressures P1, Pi, P+, P2, wherein a pressure Pi is smaller than a pressure P+ and the pressure P+ is smaller than a pressure P2, and a valve block with at least five process valves V1, Vi, V+, V2, $V_{Ex}$, wherein the application device being suitable and intended for establishing a fluid connection between the valve block and a mouth region of the plastic preform in order to apply the plastic preforms with the pressurised flowable medium. The process valves are suitable and intended to apply the plastic preform with different pressures, wherein at least one process valve is suitable and intended to establish a connection between the plastic container and an environment.

Preferably, the process valves apply the plastic preforms independently of each other with the flowable medium, wherein the valves are particularly preferably arranged parallel to each other. The establishment of the connection between the plastic container and the environment by a process valve, and in particular the process valve $V_{Ex}$, preferably corresponds to the relief of the plastic container, preferably in the last recycling stage. If, for example, four pressures are applied to the plastic preforms, this is preferably followed by four recycling or relief stages, wherein the relieved or recycled compressed air of a recycling stage is used to apply pressure to the subsequent plastic preform in the next lower pressure stage. The compressed air that remains after the last recycling stage or is not used for the blowing process of a subsequent container is released to the environment. It is therefore preferable if this amount of compressed air is as low as possible.

The forming device is preferably a blow moulding machine and particularly preferably a stretch blow moulding machine. Accordingly, the forming station is preferably a blow moulding station and particularly preferably a stretch blow moulding station. The stretching bar of the forming device is preferably an electric stretching bar or stretching unit. A maximum stretching speed of the electric stretching unit is greater than 1.4 m/s preferably greater than 1.8 m/s particularly preferably greater than 2.2 m/s. Preferably, the electric stretching unit is a linear motor and particularly preferably an electromagnetic direct drive in preferably tubular form. It would also be conceivable to guide the stretching bar via preferably guide cams or a pneumatically driven stretching bar, or a combination of pneumatic and electric drive.

Preferably, a connecting space is provided downstream or after the process valves. The connecting space is understood to be an area or space between the valve block and the plastic container to be formed or an area downstream or after the valve, between the valve and the plastic container. Preferably, each process valve is connected to the connecting space. The pressure P1 is preferably a pre-blowing pressure, the pressures Pi and P+ are intermediate blowing pressures and the pressure P2 is a final blowing pressure. The pressure P1 can be greater than, less than or equal to the pressure Pi and/or P+.

According to the invention, at least one adjustable throttle is arranged between the pressure reservoir P1 and the process valve V1, the flow rate of which is determined by an adjustable throttle cross-section, wherein a throttle cross-section is adjustable in such a way that it is larger than 28 mm$^2$, preferably larger than 38 mm$^2$ and particularly preferably larger than 52 mm$^2$. The cross-section adjustment of the throttle is thereby preferably reproducible. Particularly preferably, a volume between the throttle or the pressure reservoir and the valve is varied or changed.

Preferably, the flow rate of the at least one throttle is determined by an adjustable throttle cross-section, wherein the throttle cross-section is adjustable in such a way that it is not smaller than 19.7 mm$^2$, preferably not smaller than 12.6 mm$^2$ and particularly preferably not smaller than 7.1 mm$^2$.

Particularly preferably, the throttle cross-section can be adjusted up to a maximum of 29 mm$^2$, preferably up to a maximum of 38 mm$^2$ and particularly preferably up to a maximum of 52 mm$^2$. Accordingly, an adjustment range of the throttle cross-section is preferably between 19.7 mm$^2$ and 52 mm$^2$, preferably between 12.6 mm$^2$ and 38 mm$^2$ and particularly preferably between 7.1 mm$^2$ and 29 mm$^2$. Particularly preferably, an adjustment range of the throttle cross-section lies at 7.1 mm$^2$ to 52 mm$^2$, preferably in any ranges within this range.

Accordingly, it is proposed according to the invention to provide an apparatus for forming plastic preforms and in particular a valve block which combines an additional intermediate or recycling stage and an adjustable throttle. This preferably leads to small dead spaces in the valve block, low switching volumes, fast switching times, good flow values and optimal process settings.

Advantageously, this also enables a better reproducibility of the container quality and the switching time of the process valve V1 and thus a higher rotation speed of the blowing wheel. When mapping the process air, the apparatus according to the invention achieves a steeper rise and fall of the pressure curve, which leads to higher station outputs. Furthermore, the combination of the adjustable throttle and the additional intermediate pressure stage allows for lower dead space, lower control air pressure/volume, resulting in lower energy consumption. Also, a modular valve block with a low-cost basic design can be provided.

Preferably, the additional intermediate stage P+, as explained in more detail in the figures, reduces the compressed air consumption. Due to these optimised pressure flows, fast pressure rise times are possible and thus fast station outputs, so that the blowing time is reduced and the container is blown faster. The blow nozzle is preferably lifted from the mouth of the container or removed from the container when there is still pressure in the container. Up to now, as is known from the internal prior art of the applicant, it was only lifted off when there was no more pressure in the container.

Particularly preferably, the holding time is also increased when the maximum pressure P2 is applied. This leads in particular to improved container quality. In particular, it is advantageous to reach the P2 pressure level quickly, so that the (absolute) holding time between the time when 90% of the P2 pressure is reached and the time when the process valve $V_{Ex}$ opens is maximised.

Advantageously, the process valves are arranged in such a way that a minimum dead space is formed within the valve block. Preferably, the at least four valves are arranged in more than two planes so that the dead space volume is less than 150 ml, preferably less than 100 ml and particularly preferably less than 80 ml. A small dead space can further reduce the air consumption. The dead space of the valve block is preferably understood to be the entire space between the mouthpiece of the container and the valve seats and pressure transducer that can be filled with air. The process valve that puts the connection space in communication with an environment is preferably an independent process valve.

The forming device preferably has a pressure pad, wherein the connections and/or lines and/or the dead volume to the pressure pad are in total preferably less than 120 ml, preferably less than 80 ml and particularly preferably less than 60 ml, in order to further reduce the compressed air consumption. If the design of the forming device or the blow mould permits, i.e. if it has a suitable mould carrier construction, the pressure pad can preferably also be omitted. Preferably, a forming device without pressure pad is also conceivable, which also reduces the consumption of compressed air.

Preferably, a dead space in the BKIR (bottom cooling in series) stretching rod and the associated valve is also less than 50 ml, preferably less than 30 ml and particularly preferably less than 15 ml. The bottom cooling in series can preferably also be omitted.

As mentioned above, at least part of the used stretch blow-moulding air is recycled and used for blow-moulding the following container. With regard to the air consumption, it is advantageous to keep the air released to the environment in the last recycling stage low. Preferably, the relief pressures are less than 8 bar, preferably less than 7 bar and particularly preferably less than 6 bar. If four pressures or pressure levels are applied to the plastic preform and/or the plastic container, there are also preferably four recycling stages, as already mentioned above.

The process valves $V_{Ex}$ and V2 preferably have small switching volumes and are each switched only once during the forming of the plastic container. The process valves P1, Pi and P+, on the other hand, are preferably switched twice, once when the plastic container is applied with the corresponding pressure level and once during the associated recycling stage. It is therefore advantageous to design the process valves P1, Pi and P+ in such a way that they require little control air volume and little control air pressure. Preferably, the control volume for an entire process cycle of a plastic container to be produced is less than 60 ml, preferably less than 45 ml and particularly preferably less than 30 ml. The air consumption is correspondingly preferably less than 0.6 g, preferably less than 0.45 g and particularly preferably less than 0.3 g. This can preferably be achieved by pressure-compensated valves.

In a preferred apparatus, the pressure P1 is variably adjustable and preferably less than 8 bar and particularly preferably less than 6 bar and preferably greater than 3 bar and particularly preferably greater than 4 bar and/or the pressure P2 is variably adjustable and preferably greater than 16 bar, preferably greater than 18 bar and particularly preferably greater than 22 bar. The pressure level of these pressure stages can therefore be easily adapted to the current requirements, such as different container sizes. The pressures for P1 and P2 are contrasting requirements, since with a small P1 pressure the air consumption is reduced, but with a large P2 pressure a good container quality can be achieved.

In a further preferred embodiment, the pressure reservoirs and the valve block are connected via lines and in particular compressed air lines whose smallest cross-sections are greater than or equal to 110 $mm^2$, preferably greater than or equal to 140 $mm^2$ and particularly preferably greater than or equal to 155 $mm^2$. Preferably, this is a connection between the application device and the pressure reservoirs for the pressures Pi and/or P+ and/or P2.

In a further preferred embodiment, the application device is movably mounted in the valve block. Particularly preferably, the application device and, in particular, the blowing piston and/or the blowing nozzle can be moved in a longitudinal direction of the plastic container and/or can be moved towards the plastic container.

In a preferred embodiment, a forming station, particularly preferably each forming station, has at least one sensor for determining a pressure, wherein the pressure here being in particular between a process valve and the plastic preform. In this way, it is possible to determine and/or monitor the pressure level and thus also indirectly the air consumption. For example, an error message can preferably also be issued in a suitable or known manner if the pressure is too high and/or too low.

In a particularly preferred embodiment, the apparatus has exactly five process valves (V1, Vi, V+, V2, $V_{Ex}$), i.e. five valves are arranged within the valve block and/or on the valve block. Preferably, a combination of an additional (intermediate) pressure stage, five process valves and an adjustable throttle is proposed in order to achieve the smallest possible dead space and save energy. In the embodiment according to the invention, this combination enables low compressed air consumption with high container quality.

In a further preferred embodiment, a flow cross-section of the process valves Vi and V+ and/or V2 and/or $V_{Ex}$ between the respective process valve and the application device is in each case greater than or equal to 150 $mm^2$ and preferably greater than or equal to 200 $mm^2$. A flow cross-section of an annular gap between the inner wall of the mouth area of the plastic preform and the stretching bar is preferably narrowed by less than 50% in mouth areas with an inner diameter of less than 22 mm by optimised blow nozzle inner geometries.

In a preferred embodiment, a stroke movement or an amplitude of the stroke movement of the blowing piston is greater than 15 mm, preferably greater than 12 mm and preferably greater than 10 mm and less than 60 mm, preferably less than 45 mm and preferably less than 30 mm.

The process valves Vi and/or V+ and/or V2 and/or $V_{Ex}$ are preferably pneumatically pilot-controlled seat valves whose seat has a cross-sectional area greater than 150 $mm^2$ and preferably greater than 200 $mm^2$. Preferably, the process valves Vi and/or V+ and/or V2 and/or $V_{Ex}$ are pneumatically pilot-controlled seat valves whose working stroke is less than 6 mm. The stroke is decisive for the service life and the control air consumption of the valve. A small stroke leads to a longer service life and lower air consumption.

In a further preferred embodiment, the process valves Vi and/or V+ and/or V2 and/or $V_{Ex}$ are pneumatically pilot-controlled at least partially compensated poppet valves. Preferably, the process valves Vi and/or V+ and/or V2 and/or $V_{Ex}$ are pneumatically pilot-controlled poppet valves which are actuated by control devices, such as preferably electric pilots, which switch programme-controlled.

A basic shape of the mentioned connection space and in particular of a connection space outer wall is a circle larger than 40 mm and smaller than 80 mm. Connecting holes of valves preferably penetrate the basic shape of the outer wall of the connecting space almost at the same level.

In a preferred embodiment, the at least one throttle is adjustable between at least two, preferably at least four and particularly preferably at least five fixed positions, wherein the adjustment preferably being producible by a rotatable cylinder with different passage bores.

Advantageously, the at least one throttle can be variably adjusted by changing the distance between two orifice parts that are moved towards each other or by exchanging insert parts.

In a further preferred embodiment, the at least one throttle can be adjusted manually, by motor or without tools. Particularly preferably, a volume between the throttle or the pressure reservoir and the process valve can be varied by adjusting the at least one throttle. In particular, the throttle is adjusted by linear or rotational movement.

The motor for motorised adjustment is preferably selected from a group of motors or drives comprising a stepper motor, a servo motor, a pneumatic drive, an electromagnetic drive or a piezoelectric drive.

Preferably, however, it would also be conceivable that the adjustment of the throttle can be made from combinations of the above-mentioned possibilities, for example a mechanical coarse adjustment and a piezoelectric adjustment of fine gradations.

Adjusting the throttle with a stepper motor is preferred. Preferably, the valve block contains at least two throttle positions which are connected by means of a coupling rod. A further volume is created between these throttle positions, wherein it would be possible to provide a booster setting for small bottles and a setting for large bottles in order to adjust or change the throttle setting.

Particularly preferably, the apparatus and especially the valve block has two throttles which are connected to each other via a coupling rod. The throttles can preferably be adjusted as desired or depending on the current requirements.

Particularly preferably, the throttles are adjusted via a stepper motor, wherein each step of the stepper motor describes a position of the throttle. When starting the machine, a reference run of the throttles is preferably carried out, wherein the throttles are preferably moved up to their stop. Then it is necessary to open the same number of steps, whereby the start position is found. After that, it is only necessary to standardise a pre-blowing curve.

The standardisation of the pre-blowing curve can preferably be avoided by depositing a table, so that the adjustment of the throttles is carried out via indirect control, for example, cross-sections of the throttles, for example 1.1 mm, 1.2 mm . . . 8.5 mm, are assigned steps, so that, for example, a cross-section of 5.4 mm corresponds to 2350 steps.

Such a procedure is advantageous, as it enables a stepless adjustment of the volume flow at P1 without having to increase the pressure. This leads to significant energy savings for the machine. In addition, it is possible to react better to different container sizes and, in particular, to improve the material distribution during pre-blowing. In addition, all blowing stations can be adjusted so that an almost identical pre-blowing curve is obtained.

The apparatus can also have a measuring device for measuring the air consumption of the entire machine. The consumption or the result of this measurement can preferably be displayed on an HMI (Human Machine Interface), stored in a cloud and/or transmitted to a handheld device. Preferably, an air quality can be measured via, for example, the particle density and size or a pressure dew point in the air supply.

If the plastic preform is made of recycled PET, it can preferably be processed at an adjustable stretching speed of less than 1.4 m/s. Preferably, an extended blowing curve monitoring is also conceivable.

The valve block is an important device of the forming device. In particular, the valve block serves to guide the application device or blowing nozzle and puts the interior of the plastic preform or plastic container in flow communication with the individual pressure levels prevailing in the forming device. For this purpose, the valve block has at least five valves, wherein preferably three of the five valves controlling the different pressure levels during pressure build-up in the bottle. One valve is preferably responsible for relieving the internal pressure of the container, the so-called exhaust valve ($V_{EX}$). Through this valve and the preferably downstream silencer, the internal pressure from the container is fed to the environment.

In valve blocks known from the prior art of the applicant, the exhaust valve is arranged on the side of the valve block and the silencer on the side facing the bearing block of the stretching module. The axial directions of the valve and the silencer are therefore different and are at a 90° angle to each other in the embodiment known from the internal prior art of the applicant.

However, this arrangement is particularly disadvantageous for the flow guidance in the valve block. The pressure of the containers is to be released very quickly, so that the flow guidance should be as direct as possible. However, with the valve block known from the prior art of the applicant, the flow must be diverted at least once, which results in considerable flow resistance. Another disadvantage is the consumption of installation space. The valve block combines several functions, which is why various other parts/assemblies are also attached to the valve block. In the design known from the prior art of the applicant, both the exhaust valve and the silencer consume installation space on the outer shell of the valve block.

Accordingly, in a particularly preferred embodiment, the exhaust valve or process valve $V_{Ex}$ is arranged coaxially to a silencer of the valve block. The silencer is preferably arranged or mounted on the valve. In one possible variant, the valve piston can be designed as a hollow piston.

A sealing device is preferably arranged between the valve and the silencer. The sealing point can preferably be designed with a flat seal, wherein suitable materials are selected for the sealing partners. Preferably, a soft seal would also be conceivable. The hollow piston mentioned above can preferably be designed in such a way that it is actively kept closed via control air. When the control pressure is released, the blow piston is preferably moved into an open position. This movement is preferably supported by a specific design of the sealing edge from the pressure in the working chamber. The working medium then preferably flows through kidney-shaped outlet openings of the valve and the hollow piston into the silencer and is supplied to the environment via the latter.

In a further embodiment, the valve is preferably arranged coaxially with the silencer and, in addition, the exhaust valve is pressure compensated. The valve piston then preferably seals directly on the valve block housing, resulting in a minimal dead space. Pressure compensation is achieved through a central hole in the valve piston. If the valve is fully compensated, the valve piston is preferably kept actively closed and actively opened. If the valve is only partially compensated, there is preferably no need to actively open the piston, as this is opened via the working pressure when the pressure is relieved. If the valve is open, the working medium flows past the piston unit in the direction of the silencer and is supplied to the environment.

In a further embodiment, the valve piston is partially compensated and is opened accordingly by the working medium and actively closed with control pressure. The valve piston is preferably internally centred and the silencer and the valve are again arranged coaxially.

Preferably, instead of being coaxial, the silencer can also be arranged at an angle to the valve, wherein the angle between the valve axis and the silencer axis is preferably less than 50°.

The above-described arrangement of the silencer in relation to the process valve $V_{Ex}$ advantageously enables improved flow guidance and higher venting performance. Furthermore, the advantageous arrangement of the silencer increases the process time window by shortening the venting time. The space on the outside of the valve block freed up by the modified arrangement can also be used for other attachments.

The present invention is further directed to a method for forming plastic preforms into plastic containers, comprising a forming device having a plurality of forming stations within which the plastic preforms are formed into the plastic containers, wherein the plastic preforms are stretched in the longitudinal direction by means of a stretching bar and are acted upon by an application device with a flowable medium and in particular compressed air, and at least four pressure reservoirs are provided, which have predetermined pressures (P1, Pi, P+ and P2), wherein a pressure Pi being smaller than a pressure P+ and the pressure P+ being smaller than a pressure P2, and a valve block having at least five process valves (V1, Vi, V+, V2, $V_{Ex}$) being provided, wherein the application device producing a fluid connection between the valve block and a mouth region of the plastic preform in order to act upon the plastic preforms with the pressurized flowable medium, and the process valves pressurizing the plastic preforms with different pressures.

According to the invention, the pressures and switching times of the process valves are selected in such a way that an air mass which is vented into the environment per plastic container after a recycling stage can be described with the formula m=x*V, wherein V describes the container volume in litres, m the air mass in grams and x a factor of the container volume as a function of the air mass, wherein $7 \leq x \leq 15$, preferably $8 \leq x \leq 13$ and particularly preferably $8.5 \leq x \leq 12$.

The factor x describes in particular the slope of a curve, in particular of an image of the pressure curve in a diagram. Accordingly, the range $7 \leq x \leq 15$ or $8 \leq x \leq 13$ or $8.5 \leq x \leq 12$ is in each case a set of curves, preferably described with the above formula.

The recycling stage which vents a pressure or an air mass of the plastic container to the environment is preferably the last recycling stage. In the case of the venting carried out in the other recycling stages, as already mentioned above, the relieved compressed air is used to apply a subsequent plastic preform in the next lower pressure stage.

In a preferred method, the pressure P1 is variably adjusted and is preferably less than 8 bar and particularly preferably less than 6 bar and preferably greater than 3 bar and particularly preferably greater than 4 bar and/or the pressure P2 is variably adjusted and is preferably greater than 16 bar, preferably greater than 18 bar and particularly preferably greater than 28 bar.

In a preferred method, the application device is raised before the pressure in the valve block falls below an overpressure of 0.1 bar, preferably 0.2 bar and particularly preferably 0.5 bar. Lifting the application device means that the application device is moved away from the plastic container, preferably after the blowing process.

In a further preferred method, switching times of the process valves are selected such that a pressure rise time t90 from the moment of a switching of Pi to reaching 90% of P2 is higher than 180 ms, preferably higher than 160 ms and particularly preferably higher than 140 ms.

The pressure descent time from the moment of switching a first recycling stage to the moment of switching the process valve $V_{Ex}$ is higher than 140 ms and preferably higher than 180 ms. Preferably, $P1 = y*P1_{base}$, wherein $2<y<5$, preferably $2.5<y<4$ and P1 is directly proportional to $P1_{base}$ or P1 is dependent on $P1_{base}$. $P1_{base}$ is the lowest pressure after the first pressure increase at P1, which is described in more detail in the figures.

The fast pressure increase can preferably be achieved by flow-optimised compressed air routing as well as by fast switching times and/or by optimised flow cross-sections in the compressed air hose in the hose connectors, in the blowing block, in the switching valve, in the blowing cylinder and in the blowing piston. In accordance with ISO 6358, very good conductance values (C values) can be achieved in both flow directions. At the pressures Pi and P+ or the process valves Vi and V+, the C-values from the pressure distributor to the blow nozzle are greater than 700 l/(min*bar), preferably greater than 800 l/(min*bar) and particularly preferably greater than 900l/(min*bar).

For a fast process, the discharge time is also decisive, so that the flow through the mouth area of the container, the blow block and the silencer are also very important. Optimised flow design at the C-values of over 1200 l/(min*bar), preferably over 1500 l/(min*bar) and particularly preferably over 1700 l/(min*bar) are preferred here.

With the forming station described according to the invention, high-quality containers for containers with a volume between 1-2.5 litres can be produced even at high station outputs greater than 2250 containers/hour, preferably greater than 2500 containers/hour and particularly preferably greater than or equal to 2700 containers/hour. In the case of containers with a volume of less than 1 litre, station outputs greater than 2500 containers/hour, preferably greater than 2650 containers/hour and particularly preferably greater than 2800 containers/hour can be produced.

Furthermore, with the forming station described according to the invention, high-quality containers for CSD applications with pneumatic internal cooling for containers between less than 1l can be produced even at a high station output greater than 2500 containers/hour, preferably greater than 2600 containers/hour and particularly preferably 2700 containers/hour.

In particular, the apparatus described above is also designed and intended for carrying out this described method, i.e. all features described for the apparatus above are also disclosed for the method described here and vice versa.

BRIEF DESCRIPTION OF THE DRAWINGS

Further advantages and embodiments can be seen in the attached drawings. In the drawings.

DETAILED DESCRIPTION OF THE INVENTION

Figure 1:
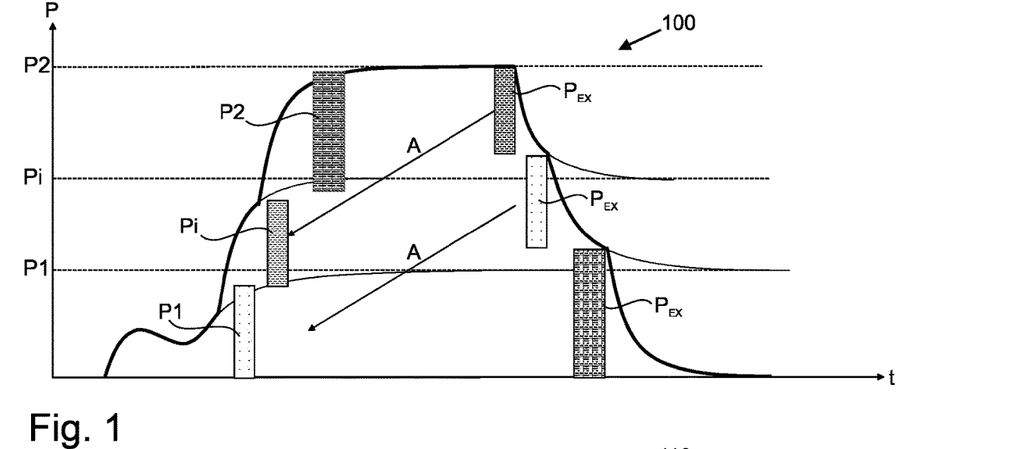
FIG. 1 shows a diagram with the course of a compressed air curve according to the state of the art.

FIG. 1 shows a diagram 100 with the course of a compressed air curve according to the state of the art. The diagram 100 shows the pressure curve P as a function of time t. The three columns on the left side of the figure, marked P1, Pi and P2, represent the pressures P1, Pi and P2 applied to the plastic container. The three columns on the right show the relief phases in which a relief pressure $P_{Ex}$ is released from the plastic containers.

The arrows A show that the pressure released in the first (upper) relief phase is used to apply a subsequent plastic container in the next lower pressure stage Pi and the pressure released in the second (middle) relief phase is used to apply the subsequent plastic container in pressure stage P1. Accordingly, the relief pressure of a preceding container of a higher pressure stage is preferably used to feed the blowing air consumption of the following container in the next lower pressure stage. New compressed air is (idealised) only supplied when pressure P2 is applied. This compressed air then passes through the pressure stages in stages, in different containers and is then vented at the last container (lower relief phase).

The third (lower) relief phase should be as small as possible with regard to pressure and energy consumption, but it must also be higher than the pressure P1, as otherwise it would not be possible to recycle the air without an additional compression unit.

Figure 2:
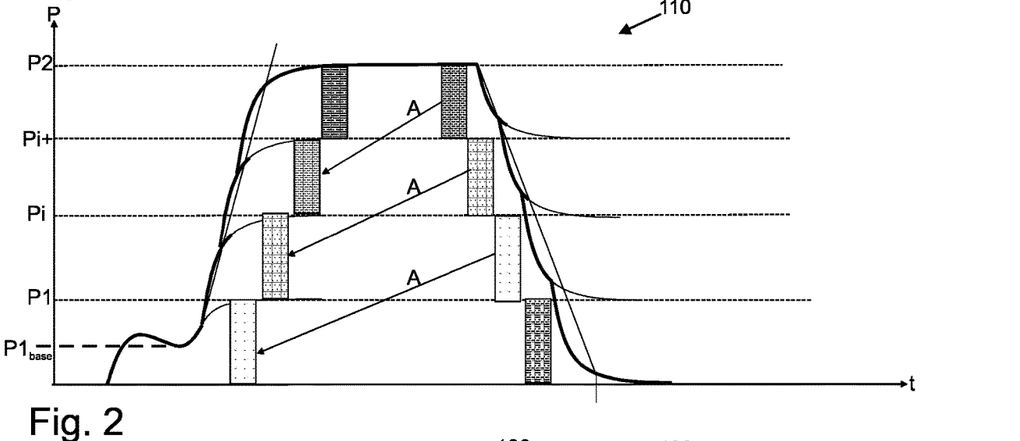
FIG. 2 shows a diagram with the course of a compressed air curve according to the apparatus/method according to the invention.

FIG. 2 shows a diagram 110 with the course of a compressed air curve according to the apparatus/method according to the invention. In contrast to the diagram in FIG. 1, there is an additional intermediate stage here in which the container is additionally applied with the pressure P+.

It can also be seen again that the relief pressures $P_{Ex}$ are used to apply a next lower pressure stage. The additional pressure stage P+ can significantly reduce the last relief phase and thus reduce compressed air consumption.

The reference sign $P1_{base}$ identifies the lowest pressure after the first pressure boost when pressure P1 is applied.

Figure 3:
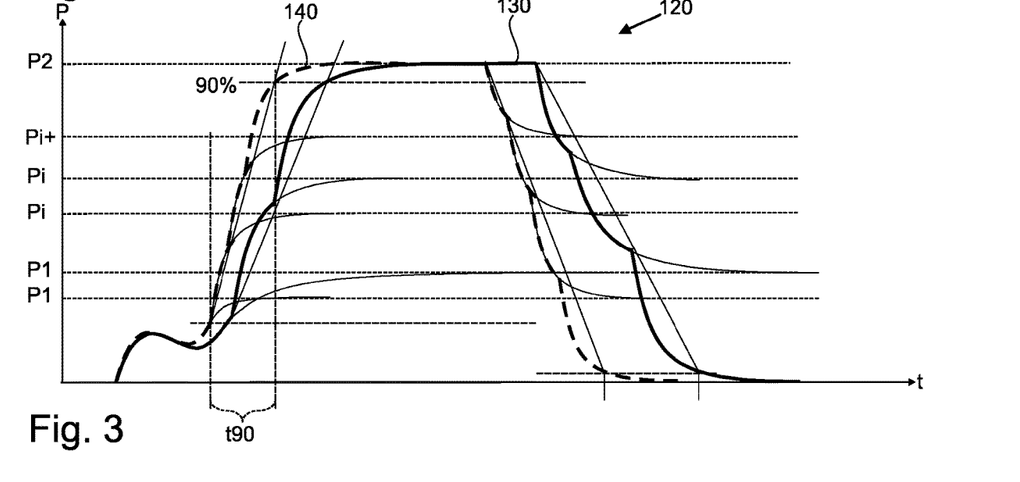
FIG. 3 shows a diagram with the curves of the compressed air curve according to the prior art and according to the apparatus/method according to the invention in comparison.

FIG. 3 shows a diagram 120 with the curves of the pressure curve according to the prior art 130 and according to the apparatus/method 140 according to the invention in comparison. It can be seen that with the apparatus according to the invention, the application begins earlier and ends sooner, so that the forming process takes place more quickly. At the same time, the container quality is improved by a longer holding time at the maximum pressure P2.

The time t90 characterises the moment when the pressure P1 is applied until 90% of the pressure P2 is reached. This time should preferably be as short as possible.

Figure 4A:
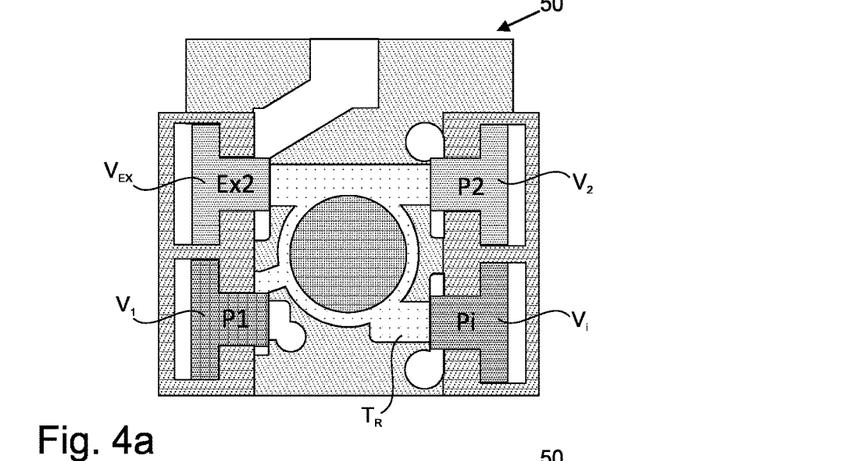
FIGS. 4a and 4b show a schematic representation of a valve block according to the state of the art.
Figure 4B:
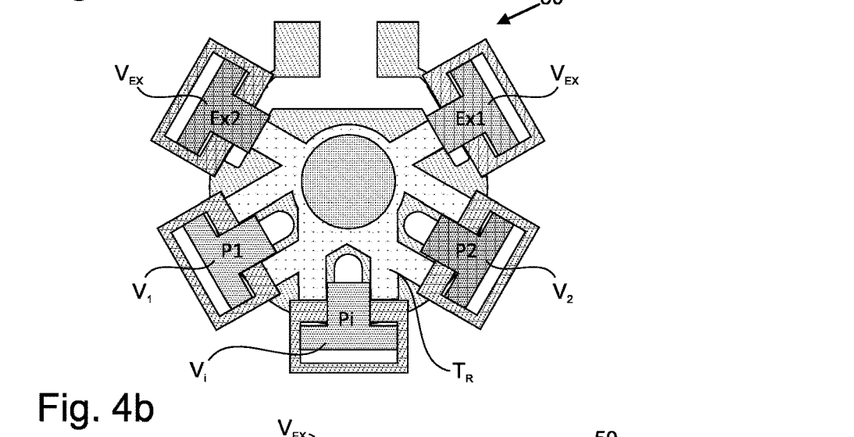

FIGS. 4a and 4b show a schematic representation of a valve block 50 according to the prior art. The valve blocks 50 here have four or five process valves V1, Vi, V2, $V_{Ex}$. However, due to the arrangement of the valves V1, Vi, V2, $V_{Ex}$, the dead space TR is relatively large here, which leads to a high installation space and a higher relief pressure.

Figure 5:
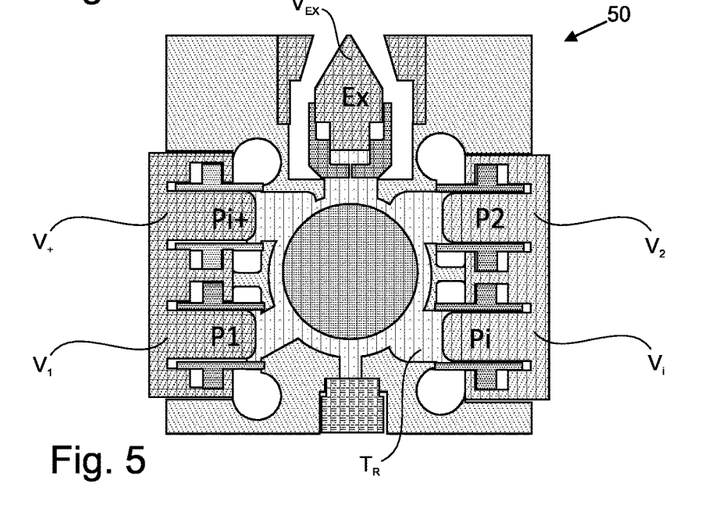
FIG. 5 shows a schematic representation of a valve block according to the invention.

FIG. 5 shows a schematic representation of a valve block 50 according to the invention. Here, the valve block 50 also has five valves V1, Vi, V+ V2, $V_{Ex}$, however, in comparison to FIG. 4b, an additional valve V+ is present for an additional intermediate stage. Compared to FIGS. 4a and 4b, the dead space $T_R$ is also reduced due to the arrangement of the valves V1, Vi, V+ V2, $V_{Ex}$.

Figure 6:
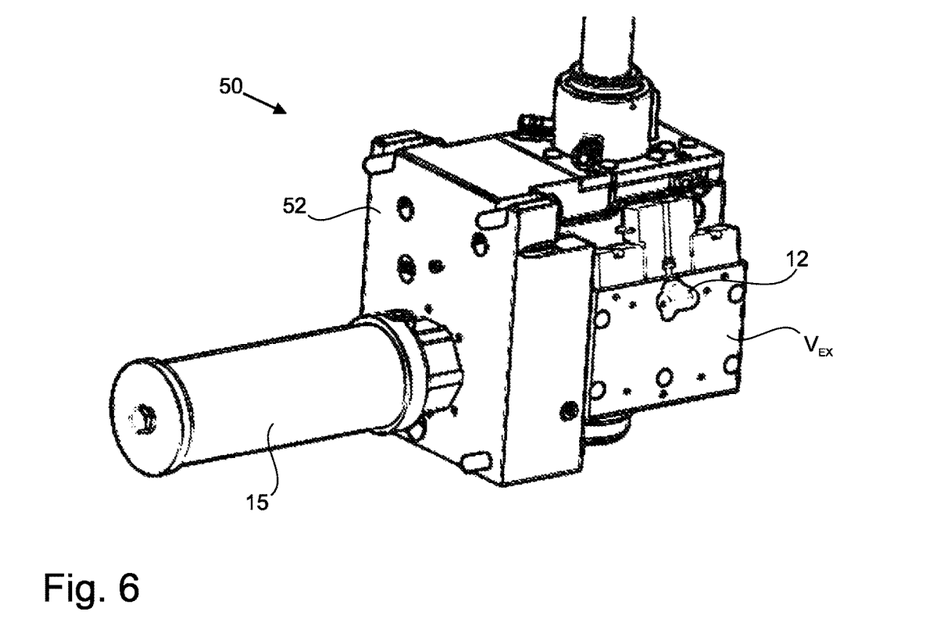
FIG. 6 shows a schematic representation of an arrangement of a silencer and a process valve according to the state of the art.

FIG. 6 shows a schematic representation of an arrangement of a silencer 15 and a process valve $V_{Ex}$ according to the state of the art. The valve $V_{Ex}$ is responsible for relieving the internal pressure of the container, wherein the relieved air is fed to the environment through this valve and the downstream silencer.

The silencer 15 and the valve $V_{Ex}$ are arranged on different sides of the valve body 52 of the valve block 50, so that the axes of the silencer 15 and the valve $V_{Ex}$ are at a 90° angle to each other. The compressed air must therefore be diverted, which leads in particular to a high flow path of the air. The reference sign 12 indicates a pilot air supply for the valve.

Figure 7:
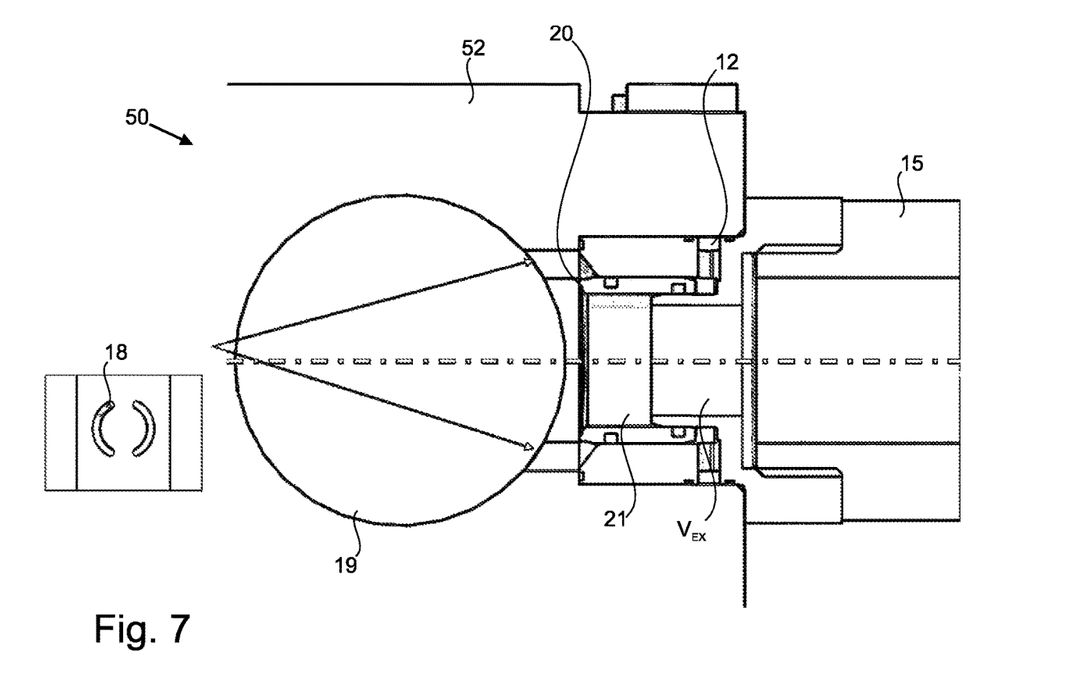
FIG. 7 shows a schematic representation of a first embodiment of an arrangement of a silencer and a process valve according to the invention.

FIG. 7 shows a schematic representation of a first embodiment of an arrangement of a silencer 15 and a process valve $V_{Ex}$ according to the invention. Unlike in the prior art, the silencer 15 and the valve $V_{Ex}$ are here arranged in one axis or coaxially on the valve body 52 of the valve block 50. Such an arrangement considerably shortens the flow path of the compressed air in particular. The reference sign 20 indicates a valve seat or a sealing device, which is designed here as an example of a flat-sealing soft seal, and the reference sign 21 indicates a valve piston, which is designed here as a hollow piston.

The left-hand illustration of FIG. 7 shows an enlarged view of the outlet openings 18, which are kidney-shaped here as an example.

In this embodiment, the valve piston 21 and in particular the hollow piston is designed in such a way that it is actively kept closed via control air and opens when the load is relieved. The compressed air then flows through the kidney-shaped outlet openings 18 and the valve piston 21 into the silencer 15 and is supplied to the environment via the latter.

In this illustration, the process chamber 19 is closed against the outlet via the valve $V_{Ex}$ and a control air chamber (not shown) for the control air supply is pressurised so that the valve $V_{Ex}$ is actively kept closed.

Figure 7A:
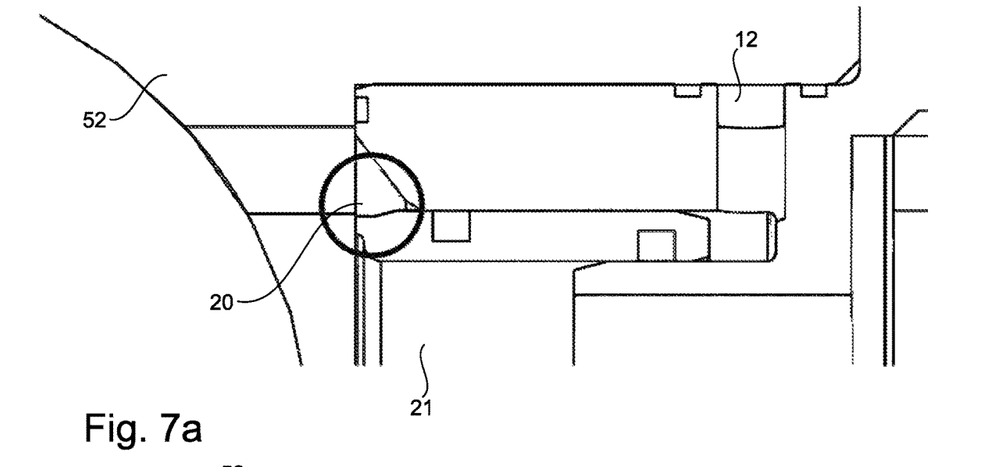
FIG. 7a shows a detailed representation of the seal shown in FIG. 7.

FIG. 7a shows a detailed representation of the sealing device 20 shown in FIG. 7. The sealing surface of this sealing device 20 is offset inwards so that the valve is opened with the support of the pressure prevailing in the process chamber when the control pressure is released. The ratio of the sealing surfaces is such that the valve can be kept closed with control pressure.

Figure 7B:
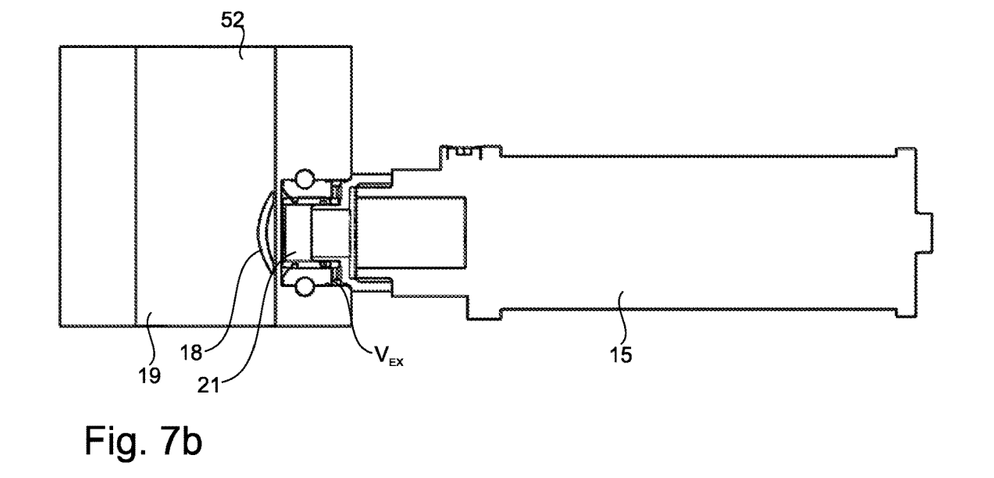
FIG. 7b shows a further schematic representation of the first embodiment according to the invention.

FIG. 7b shows a further schematic representation of the first embodiment according to the invention. In particular, the coaxial arrangement of the silencer 15 and the valve $V_{Ex}$ can be seen again from this figure. The reference sign 18 again indicates the kidney-shaped outlet opening.

Figure 7C:
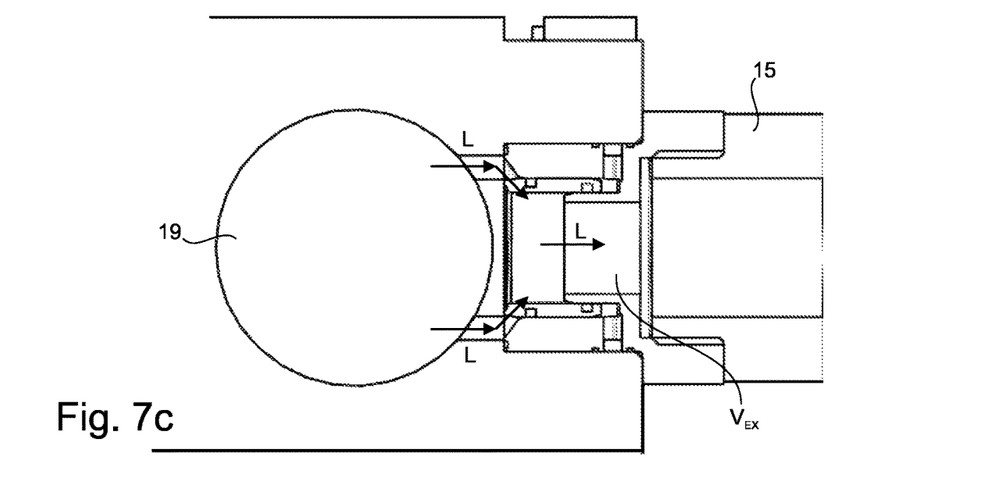
FIG. 7c shows a further schematic representation of the first embodiment according to the invention.

FIG. 7c shows a further schematic representation of the first embodiment according to the invention. In this figure, the flow path of the air stream L from the valve $V_{Ex}$ to the silencer 15, marked by arrows, can be seen when the valve $V_{Ex}$ is open.

Figure 8A:
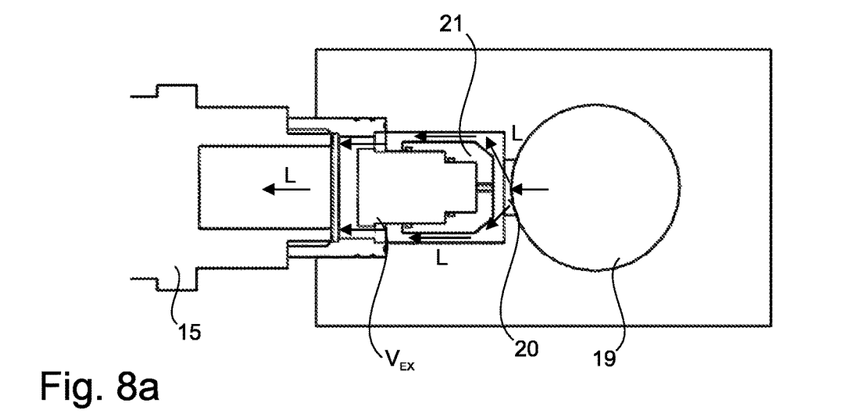
FIG. 8a shows a schematic representation of a second embodiment of an arrangement of a silencer and a process valve according to the invention.

FIG. 8a shows a schematic representation of a second embodiment of an arrangement of a silencer 15 and a process valve $V_{Ex}$ according to the invention. In this embodiment, the silencer 15 and the process valve $V_{Ex}$ are again arranged coaxially to each other. The reference sign L again indicates the air flow from the valve $V_{Ex}$ into the silencer 15 as indicated by the arrows.

Unlike in FIG. 7, the valve piston 21 is not a hollow piston here, but an internally guided or internally centred piston which is partially pressure compensated. The valve piston 21 is again opened by the compressed air and actively held closed with control pressure.

Figure 8B:
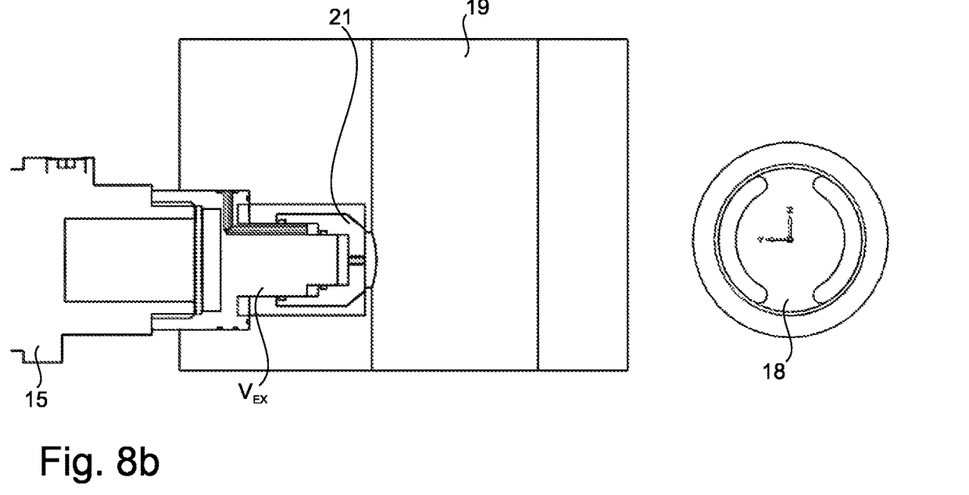
FIG. 8b shows a further schematic representation of the second embodiment according to the invention.

FIG. 8b shows a further schematic representation of the second embodiment according to the invention. The kidney-shaped outlet opening 18 is again illustrated in the enlarged righthand illustration.

Figure 9:
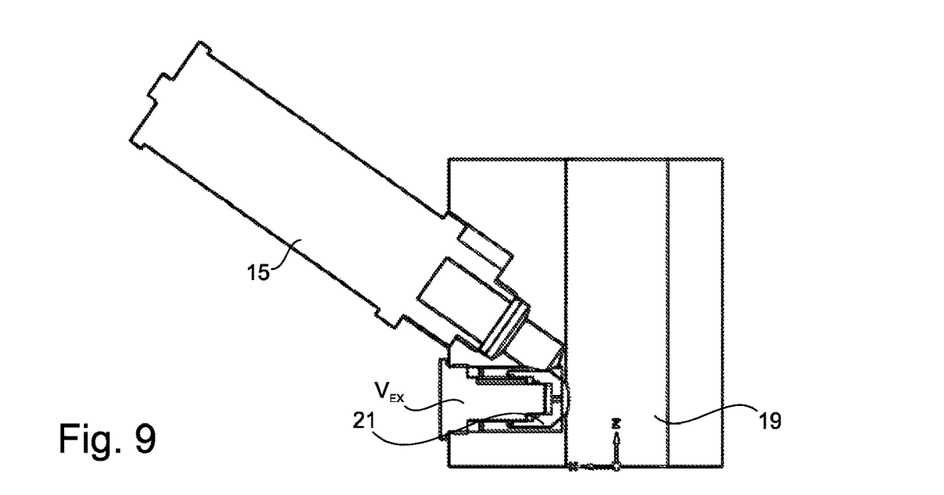
FIG. 9 shows a schematic representation of a third embodiment of an arrangement of a silencer and a process valve according to the invention.

FIG. 9 shows a schematic representation of a third embodiment of an arrangement of a silencer 15 and a process valve $V_{Ex}$ according to the invention. Here, the silencer 15 is not arranged axially to the valve $V_{Ex}$, but is at an angle to it. Preferably, the angle between the valve axis and the silencer axis is less than 50°.

Figure 10:
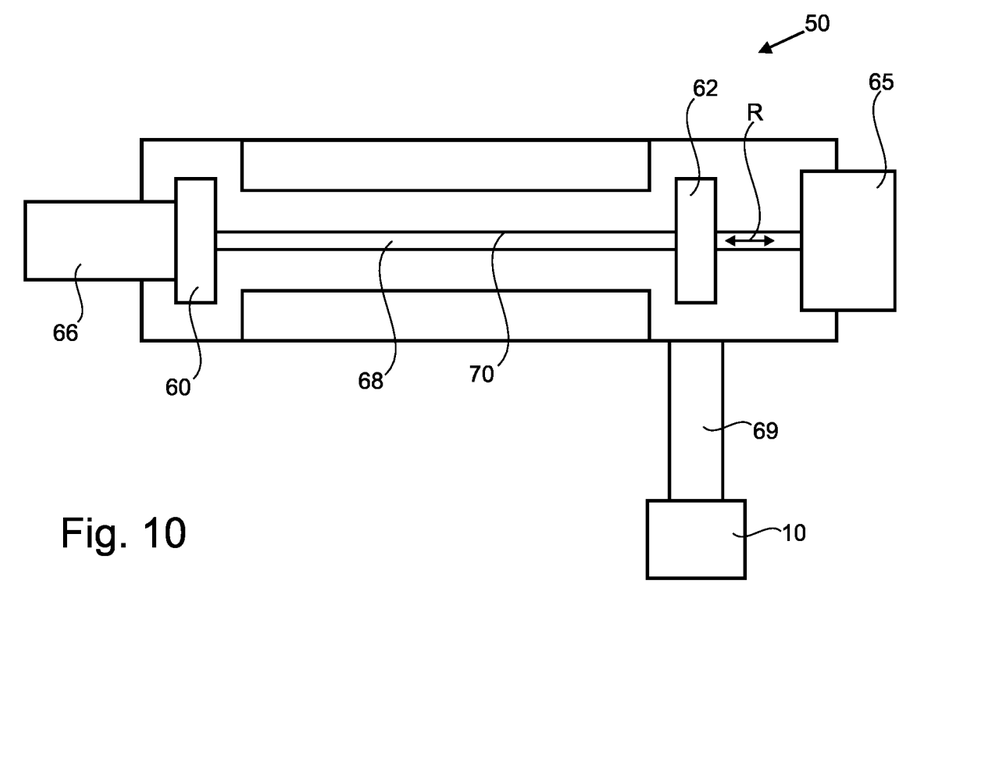
FIG. 10 shows a schematic representation of an embodiment of an arrangement of adjustable throttles according to the invention.

FIG. 10 shows a schematic representation of an arrangement of adjustable throttles 60, 62 according to the invention. Two throttles 60, 62 are arranged which can be moved along the arrows on a piston rod 70. Depending on the arrangement of the throttles 60, 62, either more or less air volume 69 of the air volume 68 present in the valve block 50 enters the plastic container 10.

The reference sign 65 indicates a drive, such as a motor, by means of which the throttles 60, 62 can be moved along the piston rod 70. The reference sign 66 indicates a compressed air supply line for the valve block 50.

The arrangement of the throttles 60, 62 shown in FIG. 10 is particularly advantageous for small plastic preforms and plastic containers.

Figure 11:
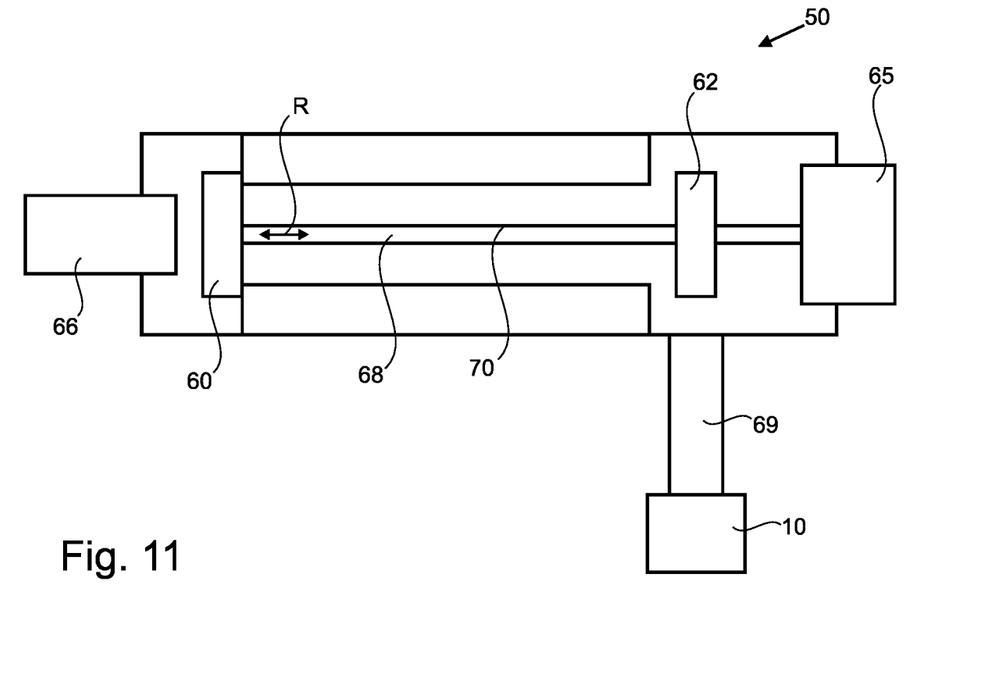
FIG. 11 shows a schematic representation of a further embodiment of an arrangement of adjustable throttles according to the invention.

FIG. 11 shows a schematic representation of a further embodiment of an arrangement of adjustable throttles 60, 62 according to the invention. The arrangement corresponds to the arrangement shown in FIG. 10. However, the position of the throttles 60, 62 shown here is particularly advantageous for larger plastic preforms and plastic containers.

The applicant reserves the right to claim all features disclosed in the application documents as essential to the invention, provided they are individually or in combination new compared to the prior art. Furthermore, it is pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS 10 plastic container
12 control air supply
15 silencer
18 outlet opening
19 process room
20 valve seat, sealing device
21 valve piston
50 valve block
52 valve body
60 throttle
62 throttle
65 drive
66 compressed air supply line
68 air volume
69 air volume
70 piston rod
100 diagram
110 diagram
120 diagram
130 state of the art pressure curve
140 pressure curve according to the apparatus/method of the invention
A arrow
$T_R$ dead space
L air flow
R arrow
P1 pressure P1, pre-blowing pressure
Pi pressure Pi, intermediate stage
P+ pressure P+, intermediate stage
P2 pressure P2, finish blowing pressure
$P_{Ex}$ relief pressure
V1 process valve
Vi process valve
V+ process valve
V2 process valve
$V_{Ex}$ process valve

The invention claimed is:

1. An apparatus for forming plastic preforms into plastic containers, having a forming device which has a plurality of forming stations which each have a blow mould within which the plastic preforms can be formed into the plastic containers, wherein the forming stations each have a stretching rod configured for stretching the plastic preform in its longitudinal direction and an application device configured for applying the plastic container with a flowable medium, wherein the forming device has at least four pressure reservoirs for the flowable medium, which each have predetermined pressures P1, Pi, P+, P2, wherein pressure Pi is smaller than pressure P+ and pressure P+ is smaller than pressure P2, and a valve block with at least five process valves V1, Vi, V+, V2, $V_{Ex}$, wherein the application device is configured to establish a fluid connection between the valve block and a mouth region of the plastic preform, to act upon the plastic preform with the pressurized flowable medium, and the process valves are configured to act upon the plastic preform with different pressures, wherein at least one process valve is configured to establish a connection between the plastic container and an environment,
wherein
at least one throttle is arranged between the pressure reservoir P1 and the process valve V1, the flow rate of which throttle is determined by an adjustable throttle cross-section, wherein the throttle cross-section is adjustable such that the throttle cross-section is larger than 28 mm², and the at least one throttle is adjustable between at least two fixed positions, wherein the adjustment is producible by a rotatable cylinder with different passage bores,
wherein
the pressure P1 is a pre-blowing pressure, the pressures Pi and P+ are intermediate blowing pressures and the pressure P2 is a final blowing pressure, so that a valve block is provided which has an additional intermediate blowing stage and wherein the relief pressures $P_{Ex}$ are used to apply a next lower pressure stage, and
wherein
the process valves $V_{Ex}$ and V2 have small switching volumes and are each switched only once during the forming of the plastic container and the process valves V1, Vi and V+ are switched twice, once when the plastic container is applied with the corresponding pressure level and once during the associated recycling stage, so that the control volume for an entire process cycle is less than 60 ml.

2. The apparatus according to claim 1,
wherein
pressure P1 is variably adjustable and is less than 8 bar and greater than 3 bar and/or pressure P2 is variably adjustable and is greater than 16 bar.

3. The apparatus according to claim 1,
wherein
the pressure reservoirs and the valve block are connected via lines whose smallest cross-sections are greater than or equal to 110 mm².

4. The apparatus according to claim 1,
wherein the application device is movably mounted in the valve block.

5. The apparatus according to claim 1, wherein each forming station comprises at least one sensor configured for determining a pressure between a process valve and the plastic preform.

6. The apparatus according to claim 1, wherein the apparatus has exactly the five process valves (V1, Vi, V+, V2, $V_{Ex}$).

7. The apparatus according to claim 1, wherein a smallest flow cross-section of the opened process valves Vi and V+ and/or V2 and/or $V_{Ex}$ and/or between the process valve and the application device is greater than or equal to 150 mm².

8. The apparatus according to claim 1, wherein a stroke movement of the application device is greater than 15 mm and less than 60 mm.

9. The apparatus according to claim 1, wherein the process valves Vi and/or V+ and/or V2 and/or $V_{Ex}$ are pneumatically pilot-controlled at least partially compensated seat valves.

10. The apparatus according to claim 1, wherein the at least one throttle is configured to be adjusted manually, by motor or without tools.

11. The apparatus according to claim 10, wherein a volume between the throttle and the process valve is variable by adjusting the at least one throttle.

12. The apparatus according to claim 1, wherein the at least one throttle is adjustable between at least four fixed positions.

13. The apparatus according to claim 1, wherein the at least one throttle is adjustable between at least five fixed positions.

* * * * *